United States Patent [19]
Nissim
[11] 3,760,121
[45] Sept. 18, 1973

[54] TELEPHONE DIALER WITH ARITHMETIC CALCULATION CAPABILITY AND VISUAL DISPLAY OF DIGITS

[75] Inventor: Samuel Nissim, Malibu, Calif.

[73] Assignee: Electronic Arrays, Inc., Mountain View, Calif.

[22] Filed: Dec. 28, 1970

[21] Appl. No.: 101,768

[52] U.S. Cl. ........... 179/90 K, 179/90 AN, 235/156
[51] Int. Cl. .......................................... H04m 1/44
[58] Field of Search ........... 179/2 DP, 90 K, 90 AN; 340/365; 178/17 A, 17 C, 17 R, 90 B, 90 BB; 235/156

[56] References Cited

UNITED STATES PATENTS

| | | | |
|---|---|---|---|
| 3,582,554 | 6/1971 | LeBlang | 179/2 DP |
| 3,601,552 | 8/1971 | Barnaby | 179/90 B |
| 3,483,553 | 12/1969 | Blankenbaker | 340/365 |
| 3,387,098 | 6/1968 | Fischer | 179/90 BB |
| 3,381,276 | 4/1968 | James | 179/2 DP |
| 3,609,248 | 9/1971 | Wolf | 179/2 DP |

*Primary Examiner*—Kathleen H. Claffy
*Assistant Examiner*—Thomas D'Amico
*Attorney*—Smyth, Roston & Pavitt

[57] ABSTRACT

A telephone desk calculator combination with shared keyboard and display for display of dialed-in telephone numbers, general figure entry and arithmetic results.

6 Claims, 2 Drawing Figures

Figure 1:
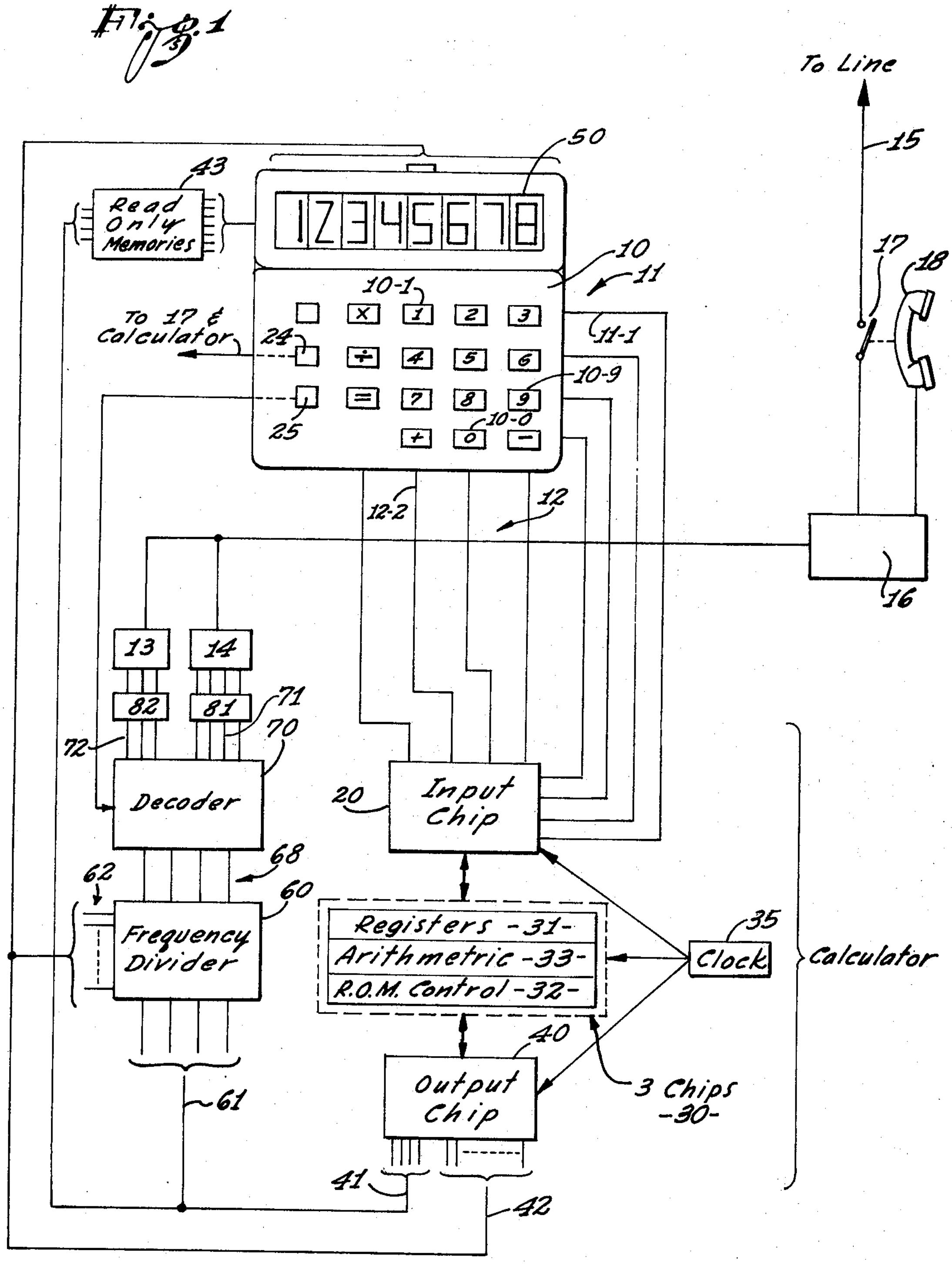

INVENTOR
Sam Nissim
By Smyth, Roston & Pavitt
Ralf H. Siegemund
ATTORNEYS

INVENTOR
Sam Nissim
By Smyth, Roston & Pavitt
Ralf H. Siegemund
ATTORNEYS

TELEPHONE DIALER WITH ARITHMETIC CALCULATION CAPABILITY AND VISUAL DISPLAY OF DIGITS

The present invention relates to a new and improved telephone subscriber facility.

In accordance with the invention it is suggested to provide a regular telephone subscriber unit with handset, transmission portion, and dial facility. Preferably, but not necessarily, the dial tone facility is of the touch tone type. The dial facility as presenting distinctive manifestation of digits dialed-in, provides these manifestations exclusively or additionally to an integrated circuit type storage facility. Particularly, and for example, a keyboard of the type used for touch tone dialing operates a switching matrix to provide two separate and unique switch states per operated key. The two separate switch states are now coupled respectively to a cyclically operated interrogating system operating, for example, in sequence of the matrix rows with subcycles provided to run through a sense system (for example, on the columns of the matrix). This way, sequentially dialed digits are sequentially loaded into an input circuit of the desk calculator type. A desk calculator includes storage facilities for storing keyed-in digits, and it includes an output circuit preparing the digits as keyed-in for display, and also for controlling the display thereof.

These components are also used here, i.e., there is a controlled display board or panel on which the keyed-in digits are dynamically displayed, i.e., on a repetitive basis, above the visual flicker rate, so as to minimize circuit connections external to IC-chips that provide for the storage and output control. As a dialed number is, thus, displayed, the user has immediate visual verification of his dialing operation. As the number has been stored, storage may persist indefinitely, rendering the number available for immediate or later use. A particular dial out key and translating circuitry is provided so that upon operation of the dial out key, the previously dialed-in and still stored number is now used to automatically affect dial-out. Thus, circuitry is provided to couple the output circuit as controlling the display to the telephone dialing facility to obtain the desired dial-out.

It is very convenient and can be effected with only little additional circuitry, to complete the circuit arrangement so as to establish a desk calculator proper. For this, it has to be born in mind, that the data input, storage, and storage and display control circuits, are already provided and perform many of the functions needed for a calculator. The circuits are particularly included in IC-chips. The circuitry on these chips can be extended essentially through selection of appropriate masks, to include provision for effecting arithmetic operation so as to cause arithmetic operation on sequentially keyed-in multi-digit numbers. The keyboard requires some extension so as to include operational keys, but they are to the most part included in the matrix arrangement for the digit keys.

It can, thus, be seen that a combined telephone dial display desk calculator is established with plural sharing of components. This is of particular advantage, as the keyboard of the desk calculator is one of the major items of that facility. By sharing it with a telephone, a unit of considerable economic value is established, offering the added advantage of sharing the display of the desk calculator with the telephone for verification of dialed-in digits. Moreover, the desk calculator circuitry, particularly the entry, assembling and display control circuitry fits into micro electronic parts and thus occupies very little space.

Figure 2:
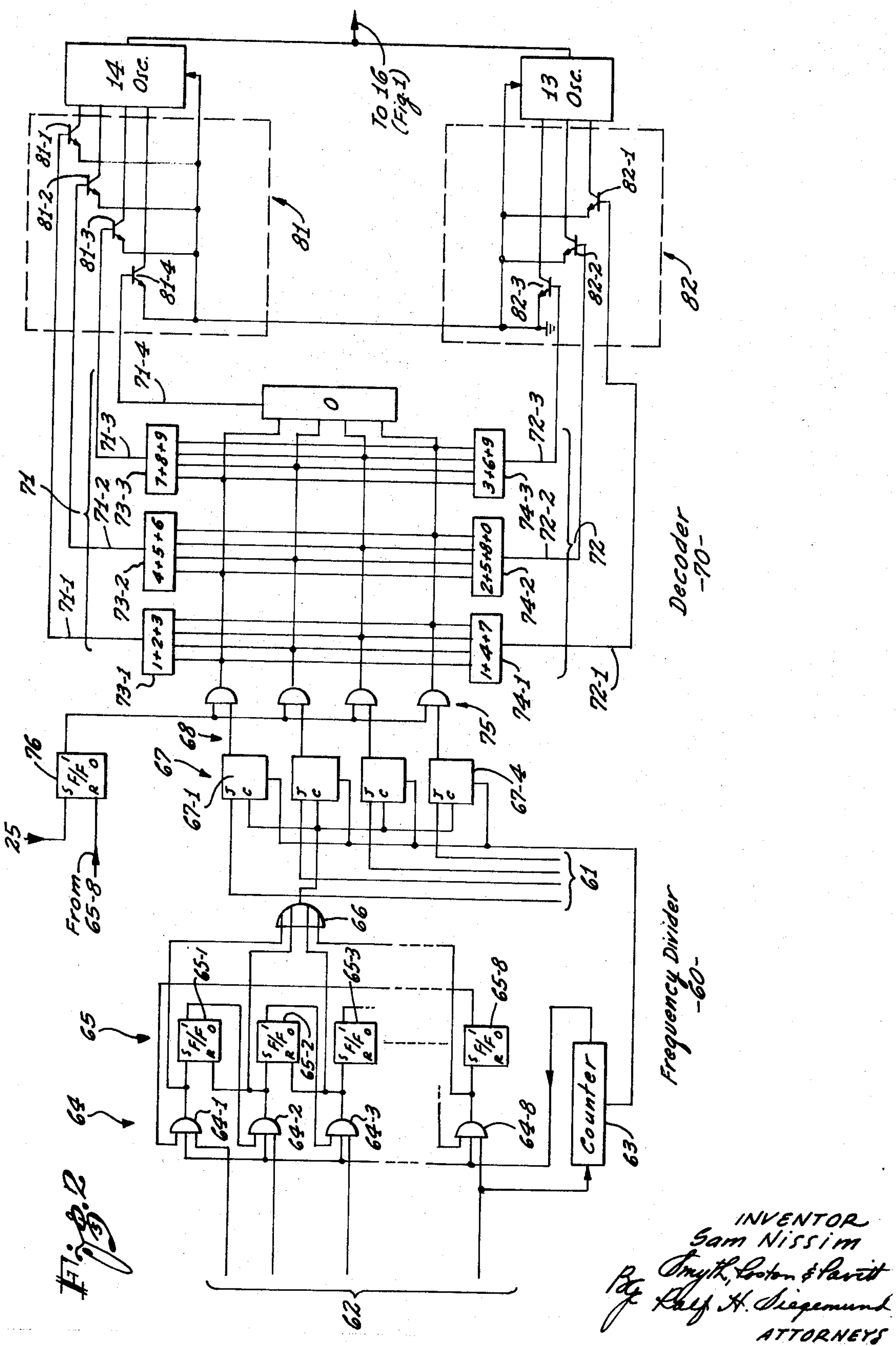

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a block diagram of an overall view of the system in accordance with the preferred embodiment of the invention; and FIG. 2 illustrates a circuit and logic diagram of a detail of the system shown in FIG. 1.

Proceeding now to the detailed description of the drawings in FIG. 1 thereof is illustrated a keyboard 10 which can be described as a supplemented, conventional touch tone telephone keyboard. The keyboard pertains to a telephone which includes the usual handset 18 and line switch 17 for connection to a subscriber line 15. Additional telephone circuitry for the subscriber outlet is contained in box 16; it is conventional and includes ringing circuitry, holding connection, multiple line connections, etc. With exception of handset 18 (though not necessarily) all elements described in the following will be contained in the housing of which keyboard 10 constitutes the front panel.

The keyboard includes the usual 10 digit keys 10–0 to 10–9 for dial-in figure entry. These keys are arranged in a 3×4 matrix as is conventional for touch tone phones. However, for purposes of practicing the invention that matrix has been increased by one row to have a 4×4 arrangement of keys. The additional keys are operational keys and will be introduced shortly.

As is conventional, upon pressing of any of such keys two switch bars are being closed. One switch pertains to a row bar which can be called a row switch bar, the other switch can be called a column switch bar; rows and columns refer to the matrix. The columns of the matrix switch arrangement are defined by column switch bars 21 (21–1, 21–2, 21–3, 21–4). The four row switch bars are collectively designated by reference numeral 11, and they are distinguished by reference numeral 11–1, 11–2, 11–3 and 11–4. The switch bars 11 and 12 connect to a particular integrated circuit chip 20, whereby, for example, the bars 11 connect to sense lines, while the four bars 12 receive interrogation pulses from that chip. The integrated circuit chip 20 and the particular circuit it contains is described in greater detail in co-pending application No. of common assignee, as input chip of a desk calculator.

In essence what is described in that co-pending application is an integrated circuit chip which provides interrogation signals into a first set of output lines, one signal at a time, and on a cyclically, repetitive basis. The repetition rate is very high and at a clock pulse frequency which for these interrogation signals is in the hundred kilocycle range. Furthermore, there is described in this co-pending application that upon pressing an input entry key a particular interrogation pulse is transmitted into a particular sense line and is being received by the internal circuit of the input chip to be processed, whereby the combination of timing of the interrogation pulse and arrival through a sense line, is being interpreted in the chip and decoded therein to denote a particular decimal figure thus entered.

It follows from the foregoing that upon pressing a digit key, such as key 10-1, an interrogation pulse set into the first row is transmitted from bar 11–1 to the sense line 12-2 of the second column to pass into input chip 20 for further processing therein. Therefore, upon pressing any digit keys of the keyboard, the particular digit is entered into the IC-chip 20.

Still referring to FIG. 1, reference numeral 30 in essence refers to three integrated circuit chips needed primarily for assembling the representation of sequentially keyed-in digits, storing same and presenting the stored signals in particular format and sequence for purposes of display. In addition, these chips complete circuitry for a desk calculator. All these chips are operated by a high frequency oscillator clock 35. In particular, that block 30 encompasses, what in the above identified co-pending application is described as the ROM-chip (200), the register chip (300), and the arithmetic chip (400). For details, particularly as to interconnection of the chips, refer to that application.

Summarizing, the ROM-chip, denoted here 31, provides control as to entry acceptance of keyed-in signals. Particularly the ROM-chip contains the microprogram for effecting the orderly loading of signals representing digits into registers of the register chip, denoted here 32. Additionally, the ROM-chip contains the stored microprogram for carrying out arithmetic operation. The register chip is under control of the ROM-chip program and contains an entry register in which sequentally keyed-in digits are assembled, e.g., in bcd format. Also, the register chip holds an accumulator into which a keyed-in multi-digit is entered when a subsequently keyed-in, multi-digit number is to be arithmetically combined therewith. The accumulator holds the result of such operation. The register chip holds also a multiplier and quotient register.

The arithmetic chip, denoted here 33, holds circuitry for timing register circulation and microprogram advance. Also, overflow is tested in this chip. Additionally, the arithmetic chip holds circuitry for arithmetically combining the bit strings as presented on serial outputs of accumulator and entry registers of register chip 32. The result is presented for return into the accumulator of the register chip and to an output chip 40 (denoted 500 in the above application) for display processing. If there is no arithmetic operation (as in the case of figure entry), the content of the entry register merely passes through the arithmetic chip to the output chip.

Now it can readily be seen, why the keyboard 10 has keys additional to keys needed for dialing telephone numbers. Among those included in the switching matrix are the command keys for the four usual arithmetic operations and an "equal" key. These keys are not used for dialing, only for purposes of command entry for the desk calculator.

The desk calculator, as used here and as described in the co-pending application, has an output chip 40. That output chip provides the display control signal needed to affect display of data held in the entry register or in the accumulation.

For understanding the present invention it is necessary to consider only the following particulars:

The chip 40 has four output lines 41 which can be termed bcd output lines as decimal figures appear as signals in bcd format in these lines for further utilization and at a particular data rate. During figure entry, as a particular decimal digit is keyed into input chip 20, that figure appears in these output lines 41 in bcd format, followed by the figures that have been entered previously. Within the chosen format a plurality of digits can thus be taken from the output chip, whereby all data to be displayed are sequentially presented on lines 41 in one output cycle. The output cycle is repeated above the flicker rate. Next, output chip 40 produces digit position signals fed to a plurality of e.g. eight, output lines 42. Each of the lines of the plurality 42 is associated with a particular position of a multi-digit figure and is raised when the particular digit for that position is presented on lines 41. Thus, each figure to be displayed is repeatedly presented on lines 41 at output cycle rate and accompanied each time by a position signal.

Lines 41 connect to a translator chip 43 of the type traded, for example, by the assignee of this application under the designation EA 3001. In essence, this chip is a read-only memory which translates bcd signals into code signals that can be used directly to control digits displays of the "seven segment" variety or of the starburst pattern type, etc.

The keyboard housing is provided with a display panel 50 having, for example, eight seven segment, digit display positions. All of the seven segments of each of the eight positions are connected to the seven output channels of chip 43 to be selectively energized in dependence upon the bcd signals applied by chip 40 via lines 41 to translator chip 43. Which one of the seven display arrangements is to be energized is determined by the energized one of the eight display position control lines 42, providing enabling pulses to the display arrangement 50. Thus, each line of the plurality 42 is associated with one seven segment display assembly for the display of a digit in a particular position of the eight digit display panel 50.

It can, therefore, be seen that upon keying-in a multi-digit telephone number, seven digits for local calls, these digits are being also received by the calculator chip arrangement and displayed on the display panel 50. The display concurs with the entry and the number keyed-in is set to the lower-most digit position (which is to the right in panel 50), while previously put-in figures are shifted by one display position to the left. Therefore, upon dialing the dialed number is shifted, so to speak, into the visible display panel 50 from the right, the display panel could readily be made larger to accommodate a 10 digit long distance number, but that was found unnecessary. As the operator dials-in a long distance number, beginning with an area code, that area code is temporarily being displayed and "moves" slowly across the panel. The number can thus be inspected as to correctness. It will wander off the display field as the remaining digits are entered and displayed. In either case the display stays until erased.

As is also described in the above identified application, the desk calculator, as disclosed therein, includes a clear entry switch which is called clear switch 24 in the present disclosure. The clear entry key is separately coupled to the IC-chips and does not form part of the switching matrix. Upon inspection, the operator may realize that he has dialed the wrong number, he may trigger immediately the clear switch 24. Conveniently, key operated switch 24 is in addition coupled to line switch 17 to disconnect temporarily the connection to line 15. That breaks temporarily the telephone connection and also erases the display from board 50. Upon releasing clear switch 24 the operator now may key-in the number again. Assuming he finds the connection busy he replaces the handset 18 but that, in turn, does not clear the board, as the mere closing of switch 17 does not reflect into the desk calculator chip assembly 20, 30, 40. The number, therefore, remains stored in, for being displayed by the desk calculator indefinitely.

A particular and unique control key is the dial out key 25. A stored telephone number is automatically dialed-out upon actuation of this key. The automatic dial-out will be described next.

A frequency divider circuit 60 is provided, having the following inputs. Four lines 61 connect respectively to the four lines 41 to receive the bcd output signals as continuously supplied by chip 40. Concurrently thereto, the position select signals in line 42 are applied to a corresponding number of eight input lines 62 for circuit 60. The repetition rate of presenting any particular digit signals in lines 41 for one of the digital positions is quite high and all numbers appear to be concurrently displayed on panel 50; i.e., the repetition cycle is at least above the flicker rate, actually it is much higher. The circuit 60 provides frequency reduction of the sequential presentation of the bcd data. Each digit is presented on output lines 68 of chip 60 for a period equal to the period required to effect dial-out of that (decimal) digit, followed by a pause of sufficient length to be recognized as inter-digit pause.

The output lines 68 of chip 60 connect, for example, to another IC-chip which may also be a ROM decoder type circuit or the like. Chip 60 provides a particular code format change. For each bcd input one out of the four lines 71 (71–1, or 71–2 or 71–3) is raised, and one out of the three lines 72 (72–1, or 72–2, or 72–3,) is raised. The four lines 71 lead to an input control circuit 81 for an oscillator assembly 13, and the three lines 72 lead to an input control circuit 82 for an oscillator 13.

Commensurate with touch tone techniques oscillator means 14 is capable of providing oscillations at four different frequencies respectively 941 Hz, 852 Hz, 770 Hz and 697 Hz. The frequency selection is the result of energization of one of the four lines 71, causing completion within circuit 14 one out of four particular oscillators. The output of the respectively enabled oscillator portion of oscillator means 14 is coupled to output line 15 that connects to the telephone exchange as soon as line switch 17 is closed.

Lines 72 control a second compound oscillator 13. Upon energization of one of the lines 72, one of three portions in oscillator circuit 13 is completed. Depending upon the particular column selection (energization of a line 72), oscillator 13 couples one of the three frequencies, 1477 Hz or 1336 Hz or 1209 Hz, to the line 15.

Each pair of lines, one from 71, one from 72, causes respectively completion of one particular oscillator in circuit 13 and one in circuit 14 so that two different frequencies are transmitted to the telephone exchange in representation of a two-frequency touch tone signal which the telephone exchange interprets as a particularly dialed digit.

In addition, the chip 70 is subject to gating and includes gating circuitry so that these outputs in lines or pluralities 71 and 72 are being provided only in case dial-out key 25 is pressed, otherwise chip 70 suppresses these signals. It will be understood readily that the repeat gating could be provided at another place, for example, could be provided in the circuit 60.

A representative example for circuits 60, 70 and 80 (which could be on one IC-chip) will be described next; for this, turn to FIG. 2.

Among others, chip 60 may include the following components. One of the eight lines 62, e.g. 62–8, is connected to a counter 63, in essence providing for an overall frequency reduction. The data cycle rate of the eight lines 62 is about $10^4$ to $10^5$ Hz, the dial rate is about 10 Hz. The counter 63, thus, provides for the required $10^3$ to $10^4$ fold frequency reduction. The cyclically produced output of counter 63 is used to enable (for one data cycle period) set input gates 64 for eight control latches 65, including latches 65–1, 65–2 ... 65–8.

A gate (e.g. 64–2) controls the set input of a latch (e.g. 65–2) while receiving as input the set state output of the preceding latch (e.g. 65–1). Also, the same gate controls the reset input of that preceding latch. Thus a latch can set only if the preceding one in the sequence is in the set state, while setting of a latch concurs with resetting of the preceding one. In essence, latches 65 establish a shift register. However, the shifting pulses are derived individually from the eight digit position lines 62 as coupled to the gates 64 as respective third inputs for each of them. Lines 62 hold enabling pulses in a particular sequence. The direction of that sequence is duplicated in the direction of shifting the set state of one of the latches 65 through this shift register.

It follows from the foregoing, each one of the gates 64 as controlled by this shift register provides pulses which concur with a position signal from the output chip. The pulses of adjacent ones of gates 64 represent adjacent digit positions and follow each other at the frequency-reduced rate as provided by counter 63 (plus one delay period as between two sequentive position signals on lines 62). The several gates 64 provide these pulses in the same sequence of data presentation on line 62. The pulse of a gate 64 coincides with the presentation a bcd character on lines 41–61 assigned to one particular position within the multi-digit signal that is presented on a cyclic basis on lines 41.

An OR gate 66 combines the outputs of gates 64, and the OR gate output serves as clock pulse for a data buffer 67. The buffer has four clocked JK flip-flops (clocking input C) or the like. The set inputs are connected respectively to the data lines 61. The four buffer flip-flops 67 receive sequentially the four bcd code signals in representation of the individual digits of the multi-digit number that is being displayed, but at a much reduced sequence. The flip-flops are d-c reset (erase input) by counter 63 but not from its recycling output that drives gates 64 but at an earlier phase in each cycle. Thus, the period in between two sequential set-inputs for the buffer flip-flops (these set inputs follow at the cycle rate of counter 63), is divided into a period during which some of the data buffer flip-flops 67 are in the set state (commensurate with a non-zero bcd-character). That period meters the required duration for dial-out of a digit. Then the flip-flops 67 are all reset and the period between resetting of all buffer flip-flops and the next set input clocking defines the inter-digit pause of dialing.

Four connecting lines 68 connect the output of flip-flops 67 to decoder chip 70 as gated by the repeat-dialing key 25. A repeat control flip-flop 76 is set by that key to enable gates 75. The dial-out number should be run through only once. Repeat flip-flop 67 is reset upon return of the shift cycle of flip-flops 65 to flip-flop 65–1.

A first decoder 73–1 responds to bcd signals on lines 68 that represent a 1, a 2 or a 3. In either case, a line 71–1 is raised. Analogously, a decoder 73–2 responds to a 4, a 5 or a 6, to raise a line 71–2, etc. A decoder 74–1 responds to a 1, a 4 or a 7, to raise a line 72–1. Operation of decoders 73–3, 73–4, 74–2 and 74–3 for raising lines 71–3, 71–4, 72–2 and 72–3, respectively, follows analogously. Thus, for each decimal digit in bcd format as held in buffer flip-flops 67, a pair of lines, one each of the groups 71 and 72 is raised for the duration needed to effect a touch tone dial-out.

It follows from the following that in case key 25 is pressed, the telephone number digit that is being stored in the circuit is presented digit for digit in a particular format, in that for a particular period of time, one out of the three lines 71 and one out of the four lines 72, are energized.

The four lines 71 respectively connect to the base electrodes of a plurality 81 of transistors 81–1 through 81–4 respectively. These transistors having interconnected emitters, the connection leading as return path to oscillator circuit 14. The collector circuits of these four transistors 81 lead individually to the circuit 14 for control of production of one of the needed pair of touch tone dial-out frequencies. The activation or response of one of the lines 71 has effect on the one transistor corresponding to the operation of one switch bar in a regular touch tone dial-out switching matrix.

The three lines 72 correspondingly lead to the respective base electrodes of a plurality 82 of transistors 82–1, 82–2 and 82–3. The emitters of these transistors are interconnected and connect to those of transistors 81 for a common return path in the oscillator network. The three collector circuits of transistors 82 pertain to oscillator circuit 13, so that the other one of a pair of touch tone frequencies is produced upon energization of one of the three lines 72.

It follows, therefore, that upon pressing key 25 the number held in the desk calculator circuitry is being dialed-out automatically. The handset has been removed so that the line switch 17 has connected the oscillators 13 and 23 to the line 15.

Aside from the use as telephone, the keyboard without removal of the handset can be used as desk calculator while the particular touch tone keyboard portion serves for figure entry. The additional keys are provided as operational keys. They are of the type outlined in the above identified application.

As stated above, the keyboard is the relatively most expensive part of such a calculator. Its sharing with the telephone touch tone keyboard is a very advantageous employment. It should also be mentioned that the arrangement can readily be used as a temporary storage of telephone numbers. For example, the user has called somebody and the conversation partner mentions a number, actually any number, but, for example, another telephone number; for example, a number under which he can be reached shortly. The operator of this particular telephone can key that number into his set, as the line switch is closed, nothing happens on the telephone line, but the number will be entered into the chip and be displayed and is ready for use at a later time. As all circuitry is miniaturized, they do not occupy more space than is available in a regular telephone.

An alternative construction is conceivable, wherein a duplicate switching matrix is provided, constructed as is conventional for touch tone dialing and connected to the oscillators 13 and 14 for operation thereof. Each digit key will activate switching bars in both matrixes. The dial-out switching matrix would be connected to operate in parallel to the circuits 81 and 82 and as alternative.

The invention is not limited to the embodiments described above but all changes and modifications thereof not constituting departures from the spirit and scope of the invention are intended to be included.

I claim:

1. A telephone subscriber facility including telephone circuitry and handset further including a keyboard which includes digit keys and control keys;

a first integrated circuit means connected to the keyboard means for receiving and storing signals representing sequentially keyed-in digits and assembling the signals as multi-digit numbers;

second integrated circuit means connected to the first integrated circuit means for providing signals in representation of these assembled signals and including means for cyclically presenting these signals as to each digit of the multi-digit number and as to all digits representing the number as a whole;

visual display means connected to receive said signals as provided by said second means and to display at least some of the digits of the keyed-in multi-digit number to obtain progressive display thereof as the digits of the multi-digit number are entered by the keyboard means;

means included in the first circuit means and connected to be responsive to operation of particular ones of the control keys to provide arithmetic operations on sequentially keyed-in numbers, the second integrated circuit means providing additional signals in representation of signals as resulting from said arithmetic operations, also on a cyclically repetitive basis for display by the display means;

second circuit means connected to the second integrated circuit means and receiving therefrom the signals on the repetitive basis and providing frequency reduction of presentation of the signals so as to obtain dial signals; and automatic dial-out means connected to be responsive to operation of a particular key of the keyboard and further connected to the second circuit means to receive said dial signals and to provide relatively low rate dial signals.

2. A telephone subscriber facility including manually operable keyboard means, telephone circuitry and handset for connection to a telephone exchange;

first integrated circuit means connected to the keyboard means for receiving and storing signals representing sequentially keyed-in digits and assembling the signals in representation of a multi-digit number;

second integrated circuit means connected to the first integrated circuit means for providing signals in representation of the assembled signals repeatedly, on a cyclical basis so that the representation of each digit of the multi-digit number as well as the number as a whole is cyclically repeated;

visual display means connected to receive said signals as provided by said second means and to display at least some of the digits of the keyed-in multi-digit number to obtain progressive display thereof as the digits of the multi-digit number are entered by the keyboard means;

circuit means connected to the second integrated circuit means and receiving therefrom the signals on the repetitive basis and providing frequency reduction of presentation of the signals so as to obtain dial signals; and automatic dial-out means connected to the circuit means to receive said dial signals and to providing relatively low rate dial signals.

3. A telephone subscriber facility, including telephone circuitry and handset, further including a keyboard, that includes digit keys arranged in a matrix having rows and columns;

a first integrated circuit means having sense lines and interrogation lines respectively coupled to the rows and columns of the matrix and having corresponding intersections governed by the keys, and providing cyclically repeated interrogation signals in the interrogating lines to interrogate whether any key in any row has been actuated, the first integrated circuit means including first internal means for sequentially scanning the sense lines and second internal means connected to receive an interrogating signal through a sense line when the key on an intersection of an interrogation line and the sense line has been activated as an interrogation pulse is set into the interrogation line and the sense line is being scanned;

second integrated circuit means connected to the first integrated circuit means to assemble a representation of sequential digit entries by operation of the keyboard;

third integrated circuit means connected to the first and second circuit means responsive to actuation of first particular keys of the board other than dial digit keys to provide arithmetic operation on digits entered by actuation of digit keys as used for telephone number dial-in;

display means provided for display of multi-digit numbers and connected to the second and third integrated circuit means to display multi-digits numbers as they are entered by operation of the digit keys as well as the result of digital operations in response to operation of one of the particular keys; and additional circuitry connected to be responsive to a second particular key of the board other than digit keys to cause dial-out of and in response to a number held in the second circuit means.

4. A telephone subscriber facility, including telephone circuitry and handset, further including a keyboard that includes digit keys arranged in a matrix having rows and columns;

integrated circuit means having sense lines and interrogation lines leading out of the integrated circuit chip, the lines arranged corresponding to said matrix, whereby a key respectively interconnects one of said sense lines and one of said interrogation lines, the integrated circuit means including first circuit means to provide interrogation signals sequentially to said interrogation lines, and second circuit means for sequentially monitoring the sense lines while an interrogation signal is sustained on one of the interrogation lines, the first and second circuit means including a counter, the integrated circuit means including third circuit means to ascertain the state of the counter when an interrogation signal passes through a monitored sense line;

second integrated circuit means connected to the first integrated circuit means for assembling digital signals in response to sequential counter states ascertained pursuant to sequential operation of digit keys of the board, the second integrated circuit means including circuit means to provide control signals of digital significance in response to said digital signals;

display means connected to the second integrated circuit means for providing display of multi-digit numbers in response to said control signals to display digits as they are entered by operation of the digit keys; and additional circuitry also connected to the second integrated circuit means and responsive to a particular key of the keyboard other than digit keys, to cause dial-out of and in response to a number held in the second integrated circuit means and displayed by the display means.

5. A telephone subscriber facility including telephone circuitry and handset, further including a keyboard which includes digit keys; circuit means connected to the keyboard and including first, second and third integrated circuit means;

said first integrated circuit means being connected directly to the keyboard for receiving and storing keyed-in digits and assembling sequentially keyed-in digits as multi-digit numbers;

said second integrated circuit means connected to the first integrated circuit means for arithmetically processing signals as received from the first integrated circuit means and returning the processed signals to the first integrated circuit means, the second integrated circuit means presenting processed or unprocessed digital signals;

said third integrated circuit means connected to the second integrated circuit means and responsive to the presented signals and providing display control signals in response thereto; additional circuitry connected to said circuit means to be additionally responsive to operation of the digit keys for providing dial control signals representative of keyed in digits to obtain dial out of said keyed in digits visual display means connected to be responsive to the display control signals to display the presented signals; including signals representing keyed in and dialed out digits; and control keys included in the keyboard and connected to the integrated circuit means for obtaining said arithmetic processing.

6. A facility as in claim 5 said additional circuitry including the third integrated circuit means to provide dialing of the number as represented by the presented signals, the keyboard including a control key for enabling the additional circuitry.

* * * * *